Figure 1:
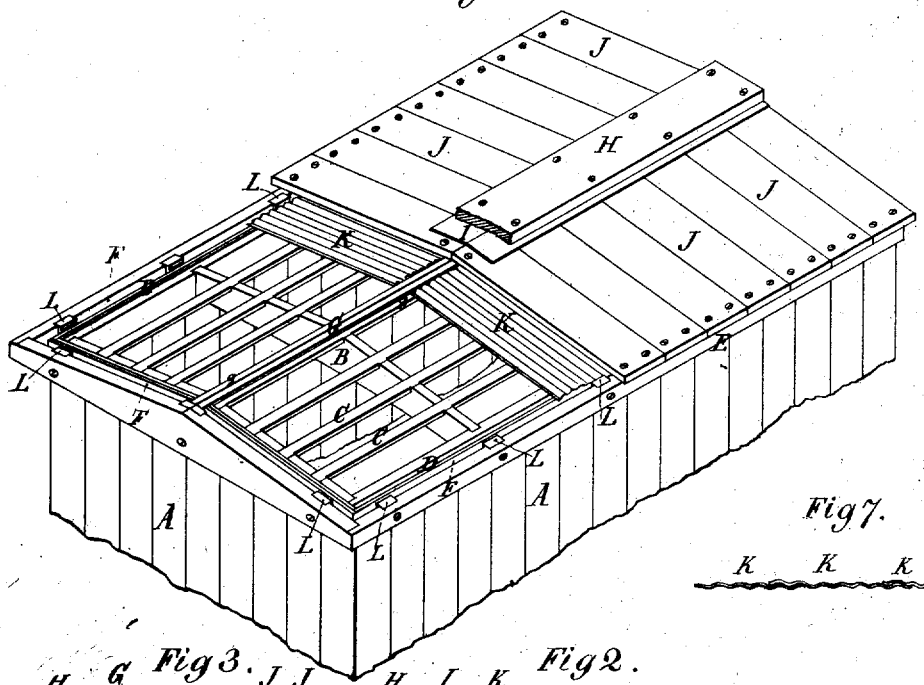

H. ALDRIDGE,

Assignor, by mesne assignments, to CHICAGO CAR ROOFING CO.

CAR ROOF.

No. 10,006. Reissued Jan. 10, 1882.

Witnesses:
J. P. Lang.
B. Carlyle Finwick

Inventor:
Hiram Aldridge
by his atty
Mason Fenwick & Lawrence

UNITED STATES PATENT OFFICE.

HIRAM ALDRIDGE, OF CHICAGO, ILLINOIS, ASSIGNOR, BY MESNE ASSIGNMENTS, TO CHICAGO CAR ROOFING COMPANY, OF SAME PLACE.

CAR-ROOF.

SPECIFICATION forming part of Reissued Letters Patent No. 10,006, dated January 10, 1882.

Original No 221,142, dated November 4, 1879. Application for reissue filed November 18, 1881.

*To all whom it may concern:*

Be it known that I, HIRAM ALDRIDGE, a citizen of the United States, residing at Chicago, in the county of Cook and State of Illinois, have invented a new and useful Improvement in Car-Roofs, of which the following is a specification.

My present invention is designed to overcome a difficulty experienced with car-roofs as heretofore constructed with corrugated or other description of metal sheets or plates overlapping each other at their side edges, beneath wood covering-boards, for the prevention of leakage, and with drip-passages between the eave edges and ends of the metal sheets or plates and the eave or outside plates for conducting the drip-water from the eave edges and ends of the roof of the car.

The difficulty referred to as being experienced is this: The sheets or plates of metal employed in the constructions heretofore adopted, not being punctured with holes for the insertion of nails or screws to hold the sheets or plates in position, were necessarily retained in place by means of the downward pressure of the upper or covering boards, which pressure tends to prevent them from slipping down and by one another when the cars are in use on railroads; but in time it is found that the hold of the covering-boards upon the sheets or plates becomes partially relaxed and the sheets or plates slide down and close the drip-passages, and thus is prevented the escape of the drip-water from the car-roof, and this water thus arrested saturates the wood-work of the roof, and in time the wood framing and covering of the car-roof rot, and serious loss is incurred; and, besides this, leakage at the ridge of the car may be experienced on account of the metal sheets or plates slipping down in the manner stated, and thus damage be caused to the contents of the car.

The nature of my invention consists, first, in a car-roof provided with furring-blocks having notches formed in them between their inner and outer edges or faces, the shoulders formed by the notching of the blocks serving as stops or abutments for the metal sheets or plates of the roof to rest upon and against, and occupying positions in the drip-passages of the roof and standing intermediate the eave or outer plates and the side or end walls of the car-body, or positions between both the side and end walls and eaves or outer plates of the car; second, in a car-roof having its metal sheets which are used for the prevention of leakage extended beyond the range of the car-body, and having drip-passages formed between the walls of the car-body and the eave or outer plates and extended down to the bottom edges of said plates, partly over which said sheets extend; third, in the combination, with metal sheets and the notched furring-blocks, of a ridge-pole rabbeted flush with the base of the notch in the furring-blocks and with the bearing-surface of the purlins and carlings; and, fourth, in the combination of the running-board, faced on its under side with metal or water shedding material, the covering or deck boards, rabbeted ridge pole, notched furring-blocks, metal sheets, and the framework of the car-roof having eave or outside plates, forming drip-passages between themselves and the side or end walls of the car-body.

By my invention of a car-roof with notched furring-blocks the metal sheets or plates used for the prevention of leakage can be kept from sliding downward and closing the drip passages at the side of the car-body, notwithstanding the sheets may be left free to expand and contract, or are allowed to move upon their foundation under extraordinary strains while the car is in use. Further, by my invention of a car-roof, with its metal sheets used for the prevention of leakage extended beyond either the side or end walls or both the side or end walls of the car-body, the drip-water is caused to discharge through the drip-passages beyond the range of the walls of the car-body in such a manner that it cannot come in contact with the wood-work of the car and saturate and subject the same to rot. Further, by my invention of a car-roof with rabbeted ridge-pole and notched furring-blocks, in combination with carlings and purlins, the metal sheets are afforded a level or flat inclined base-support from the ridge-pole to the drip-passages on each side of the ridge, and there is no liability of the metal sheets moving longitudinally and getting out of place to such an extent as to render the roof liable to leak at the ridge; and, further, by my whole combination, comprising the rabbeted ridge-pole, the running-board lined on its under side with a metal strip or other water-proof material, the notched furring-blocks, carlings, purlins, eave or outside plates, metal sheets, corrugated or other description of metal sheets or plates, and wood covering or deck boards, a car-roof can be produced at comparatively small cost, and the metal sheets can be kept down so as not to move laterally upon one another to such an extent as would render the car liable to leak at the places where the plates overlap one another, while the sheets are kept from undue movement in the direction of their length, and a free discharge of drip-water is insured, as well as danger of leakage at the ridge overcome.

Figure 7:
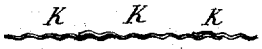
Figure 3:
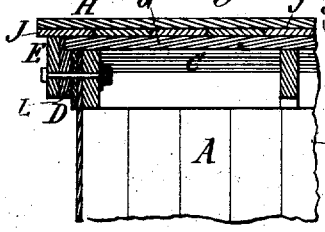
Figure 2:
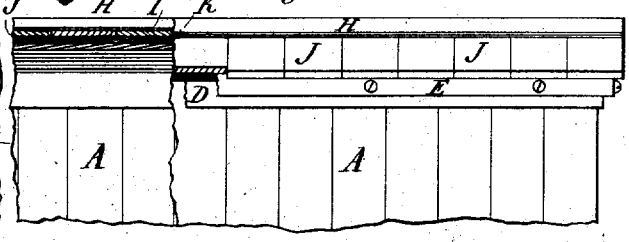
Figure 4:
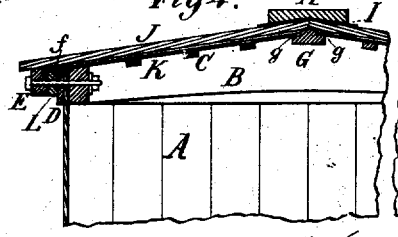
Figure 5:
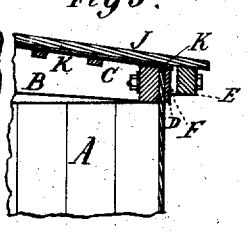
Figure 6:
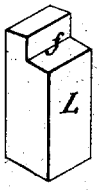

In the accompanying drawings, Figure 1 is a perspective view of a car-roof constructed in accordance with my invention. Fig. 2 is a partial side elevation and partial longitudinal section in the line of the center of the ridge-pole of the car-roof. Fig. 3 is also a partial longitudinal section in the line of the center of the ridge-pole of the car-roof. Fig. 4 is a transverse section of a part of the roof in the line of the furring-blocks. Fig. 5 is a similar section, but out of the line of the furring-blocks; and Fig. 6 is a perspective view of one of the furring-blocks, and Fig. 7 shows the manner of lapping the corrugated plates or sheets.

In the drawings, A is the sheathing of the body of the car; B, the purlins, and C the carlings, of the roof. D indicates the frieze-boards; E, the eaves or outside plates; F, the drip-passages between the plates and the frieze-boards; G, the ridge-pole; H, the running-board, with metal lining or other water-shedding material, I, under its bottom; J, the deck or top covering-boards; K, the corrugated metal or other description of metal sheets or plates, and L the notched furring-blocks.

The ridge-pole G is rabbeted on each edge at top, as shown at *g*, the rabbets being of a depth which brings their bases on a line with the top surfaces of the purlins B and carlings C of the roof.

The furring-blocks L are formed respectively with a notch, *f*, on their inner top corner, and are placed in the drip-passages F, being properly spaced in said passages, and fastened to the car-body by means of the screws or fastenings which fasten the eave or outside plates in position, said screws passing through the outer plates and furring-blocks into the car-body. The tops or highest parts of the furring-blocks come flush with the top of the outside plates, E, while the bases of their notched portions are on a plane coincident with the top surface of the purlins and carlings and with the bases of the rabbets *g* of the ridge-pole G. The bases of the notches *f* form rests for the ends of the metal sheets K at the sides of the car and for the edges of the sheets K at the ends of the car, while the vertical sides of the notches serve as abutments or stops for the said ends and edges of the sheets.

The notches *f*, which are cut in the furring-blocks to form the rests and stops, are of a size about equal to half the width of the drip-passages F, and therefore the stops or abutments, as shown in the drawings, occupy a position about midway of the drip-passages F.

In applying the metal sheets K upon the roof-framing they are placed upon the purlins and carlings with their ridge ends resting in the rabbets *g* of the ridge-pole and their eave ends resting upon and against the stops formed by the notches *f* of the furring-blocks L, and with their side edges overlapping and matching or fitting in the corrugations. The metal sheets or plates thus applied will have their eave ends extended about half-way over the drip-passages F, as shown. The wood deck or covering boards J are now applied above the metal sheets, so that their ridge ends abut against one another and their eave ends overhang the eave or outside plates, E, and they are screwed down by screws passed through them into the outer plates, E, and ridge-pole G, as represented. The metal lining I is next fastened to the under side of the running or foot board, so as to be easily removed with said board if occasion requires, which is often the case, and the said lined running-board is placed over the joints between the ridge or abutting ends of the deck-boards and fastened in place by screws which enter into the roof.

The car-roof thus constructed will have eave or outer plates, E, at its sides and front and rear ends, and drip-passages F at sides and ends between the walls of the car and the eave or outer plates, E, and the metal sheets will extend over into said passages beyond the side and end walls of the car, and by thus extending the metal sheets or plates partly over these passages the drip-water will be caused to discharge from the roof out of range of the woodwork of the body of the car, and by having the sheets so applied that they cannot move lengthwise or sidewise to an injurious extent the drip-passages will always remain open.

When the deck or top covering-boards are fastened in place by screws passed through them and into the eave or outer plates, E, as described, they will hold the metal sheets snugly to their base-support, although the sheets are not punctured and nailed in place, and these sheets will not move upward nor laterally upon one another farther than to expand and contract or to yield to extraordinary wrenching strains; nor will they be able to move either lengthwise or sidewise to an extent sufficient to close the drip-passages, inasmuch as the stops formed by the notched portions *f* of the furring-blocks act as abutments to the sheets both at the ends and sides of the car.

What I claim as my invention, and desire to secure by Letters Patent, is—

1. A car-roof provided with furring-blocks L, notched, as at *f*, and applied within drip-passages formed between the eave or outer plates, E, and the car-body, said passages being extended down to the bottom edges of said plates, whereby the metal sheets are allowed to extend beyond the outer surface of the car-body, and are prevented from slipping so as to entirely close the drip-passages, while the drip-water is allowed to directly descend to the ground without coming in contact with the car-body, substantially as described.

2. A car-roof having its metal sheets used for prevention of leakage extended beyond the range of the car-body, and having drip-passages F, which are formed between the walls of the car-body and the eave or outer plates, E, and extended down to the bottom edges of said plates E, partly over which said metal sheets extend, substantially as described.

3. The combination, in a car-roof, of the metal sheets or plates, furring blocks, notched, as at *f*, purlins and carlings, and the ridge-pole rabbeted flush with the bases of the notches of the furring-blocks and with the bearing-surfaces of the purlins and carlings, substantially as and for the purpose described.

4. The combination of the running-board, faced on its under side with water-shedding material, the covering or deck boards, rabbeted ridge-pole, notched furring blocks, metal sheets, and the frame-work of the car-roof having eave or outside plates, substantially as and for the purpose described.

HIRAM ALDRIDGE.

Witnesses:

SAML. B. HARRISON,
W. CRUICKSHANK.